United States Patent [19]
Hsieh et al.

[11] Patent Number: 5,717,871
[45] Date of Patent: Feb. 10, 1998

[54] CROSSBAR SWITCH WITH INPUT/OUTPUT BUFFERS HAVING MULTIPLEXED CONTROL INPUTS

[75] Inventors: Wen-Jai Hsieh; Chi-Song Horng; Chun Chiu Daniel Wong, all of Palo Alto; Gerchih Chou, San Jose; Shrikant Sathe, Saratoga; Kent Dahlgren, San Jose, all of Calif.

[73] Assignee: I-Cube, Inc., Campbell, Calif.

[21] Appl. No.: 516,319

[22] Filed: Aug. 17, 1995

[51] Int. Cl.⁶ ........................................... G06F 3/00
[52] U.S. Cl. ............................. 395/250; 395/312
[58] Field of Search .......................... 395/250, 312

[56] References Cited

U.S. PATENT DOCUMENTS

| | | | |
|---|---|---|---|
| 5,282,271 | 1/1994 | Hsieh et al. | 395/872 |
| 5,426,738 | 6/1995 | Hsieh et al. | 307/112 |
| 5,428,750 | 6/1995 | Hsieh et al. | 395/309 |
| 5,428,800 | 6/1995 | Hsieh et al. | 395/310 |

Primary Examiner—David Y. Eng
Attorney, Agent, or Firm—Smith-Hill and Bedell

[57] ABSTRACT

An electronic crossbar switch employs a switch array for selectively routing signals between its terminals. A separate port provided for each terminal buffers signals flowing in and out of the switch. Each port can be configured to operate with or without tristate buffering under control of a tristate control signal, to optionally latch input or output signals in response to clock and clock enable signals, and to buffer signals passing in or out of the switch terminal in response to a direction control signal. A set of control inputs are provided in common to all ports, allowing an external host to transmit control signals in parallel to each port. Each port may be programmed to select any of its control inputs as its tristate, clock enable, clocking or direction control signal. A parallel "key" bus is also provided in common to all ports for conveying a key address from the host controller. Each port stores an internal port address and when the key address matches the port address, the port asserts an internal "KEY" signal. Each port may be configured to use the KEY signal selectively as either its tristate, clock enable, clock or direction control signal.

16 Claims, 5 Drawing Sheets

CROSSBAR SWITCH WITH INPUT/OUTPUT BUFFERS HAVING MULTIPLEXED CONTROL INPUTS

BACKGROUND OF THE INVENTION

1. Field of the Invention

The present invention relates in general to crossbar switches for routing signals between switch ports and in particular to a crossbar switch having input/output buffers with multiplexed control inputs.

2. Description of Related Art

A typical electronic crossbar switch includes a set of N ports, a switch array interconnecting the ports, and a static random access memory (SRAM). The switch array is made up of N buses and a set of pass transistors. Each bus is hard-wired to a separate one of the ports while the pass transistors couple all other ports to the bus such that any two ports may be interconnected by turning on one particular pass transistor. Each pass transistor is controlled by a separate bit stored in the SRAM and each selectively interconnecting a separate pair of the ports. The crossbar switch can route a signal from any one port to any other port(s) by turning on the appropriate pass transistor(s). In a nonblocking crossbar switch the connection between any two ports can always be established regardless of the state of other connections in the switch array and a connection between any two ports can be made or broken without affecting any other connection. A crossbar switch can be used for bus switching, data path routing and packet switching networks.

It is often desirable or necessary to provide ports which buffer signals as they pass in or out of the crossbar switch. The buffering operation provided by a port can include amplification, level shifting or inversion, latching or other signal conditioning processes. U.S. Pat. No. 5,282,271 titled I/O BUFFERING SYSTEM TO A PROGRAMMABLE SWITCHING APPARATUS issued Jan. 25, 1994 to Wen-Jai Hsieh et al describes a crossbar switch having a buffer in each switch port. Each port includes internal registers for storing control data supplied to the port via a serial bus. The stored data selects modes of buffer operation. Each port may operate in either bidirectional and unidirectional buffering modes. In the bidirectional mode, the port automatically senses the direction of signal flow into the port and buffers the signal in the appropriate direction.

When operating as unidirectional buffer, tristate control is provided by a set of 8 tristate control lines TS0–TS7 supplied in common to all buffers. Each buffer includes an internal multiplexer for selecting one of the 8 tristate control lines for controlling the buffer's tristate operation and an internal register storing programming data for controlling the multiplexer selection. Since there are only eight tristate control lines, tristate operation of only a maximum of eight switch ports can be independently controlled. One could increase the number of input tristate control lines, but this would also increase the number of pins of the integrated circuit implementing the crossbar switch, thereby increasing the size and cost of the integrated circuit package.

When operating in bidirectional mode, the buffers automatically sense the direction of the data signals passing in or out of the switch. They do not require externally generated direction control signals. However in some applications it is necessary to allow an external device to control the direction of port buffering. But providing independent direction control signal inputs to each port would vastly increase the number of control signal inputs to the ports.

In some applications, it would also be desirable for each port to operate in a synchronous fashion, latching incoming and outgoing signals in response to input clock and clock enable signals. However, the necessary clock and clock enable inputs to each port would also greatly increase the number of control signal inputs, particularly for large crossbar switches having many ports.

Telecommunications systems have traditionally used two techniques for switching data streams, space division multiplexing (SDM) and time division multiplexing (TDM). Cross-bar switches such as that described by the aforementioned U.S. Pat. No. 5,282,271 provide space division multiplexing wherein a signal at any one input port may be selective routed to any output port. In time division multiplexing, the input and output ports connected to a bus change periodically. The prior art crossbar switch changes the ports connected to each of its internal buses by storing new data in its SRAM but cannot do so fast enough to provide time division multiplexing for a telecommunication system.

What is needed is a crossbar switch having a port at each terminal which may configured to operate with control of tristate buffering, latching and buffering direction provided by externally generated control signals but which requires only a relatively small number of control signal inputs. What is also needed is a crossbar switch which can provide not only space division multiplexing but time division multiplexing as well.

SUMMARY OF THE INVENTION

In accordance with the invention, an electronic crossbar switch employs a switch array for selectively routing data signals between its ports. Each port can be programmably configured to buffer a separate data signal either unidirectionally or bidirectionally, with or without tristate buffering and with or without clocked latching of the data signal. Depending on the manner in which each port is configured, the port may operate under control of externally generated control signals including tristate buffer or direction control signals or latch clock and clock enable signals.

In accordance with one aspect of the invention, a set of control signal inputs are provided in common to all ports, allowing an external host controller to transmit the same set of control signals to each port. Each port may be programmed to select any of its control inputs as its tristate, clock enable, clock or direction control signal. The ability of the ports to select the function of each particular control input gives the port flexibility in the use of control inputs and reduces the number of crossbar switch control inputs required to implement various modes of port operation.

In accordance with another aspect of the invention, a parallel "key" bus is also provided in common to all ports. The key bus conveys a port address from an external source. Each port stores an internal tag address and when the key address matches the tag address, the port asserts an internal "KEY" signal. Each port may be configured to use the KEY signal selectively as either its tristate, clock enable, clock or direction control signal.

When the output count of a counter is connected to the KEY bus and the multiplexer is configured so that the KEY bus controls tristate buffers for input ports and controls a clock enable signal for output ports, the crossbar switch can operate as a time division multiplexer. By appropriately setting the tag addresses in the ports the port interconnection pattern provided by the crossbar switch changes with the count on the KEY bus.

It is accordingly an object of the invention to provide a crossbar switch for routing signals between its terminals, wherein the crossbar switch has a port at each terminal which may configured to operate with optional tristate buffering, latching and direction control provided by externally generated control signals. It is another object of the invention to minimize the number of externally generated control signal inputs needed to control the ports. It is a further object of the invention to provide a crossbar switch having time division multiplexing capability.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

DESCRIPTION OF THE PREFERRED EMBODIMENT(S)

Figure 1:
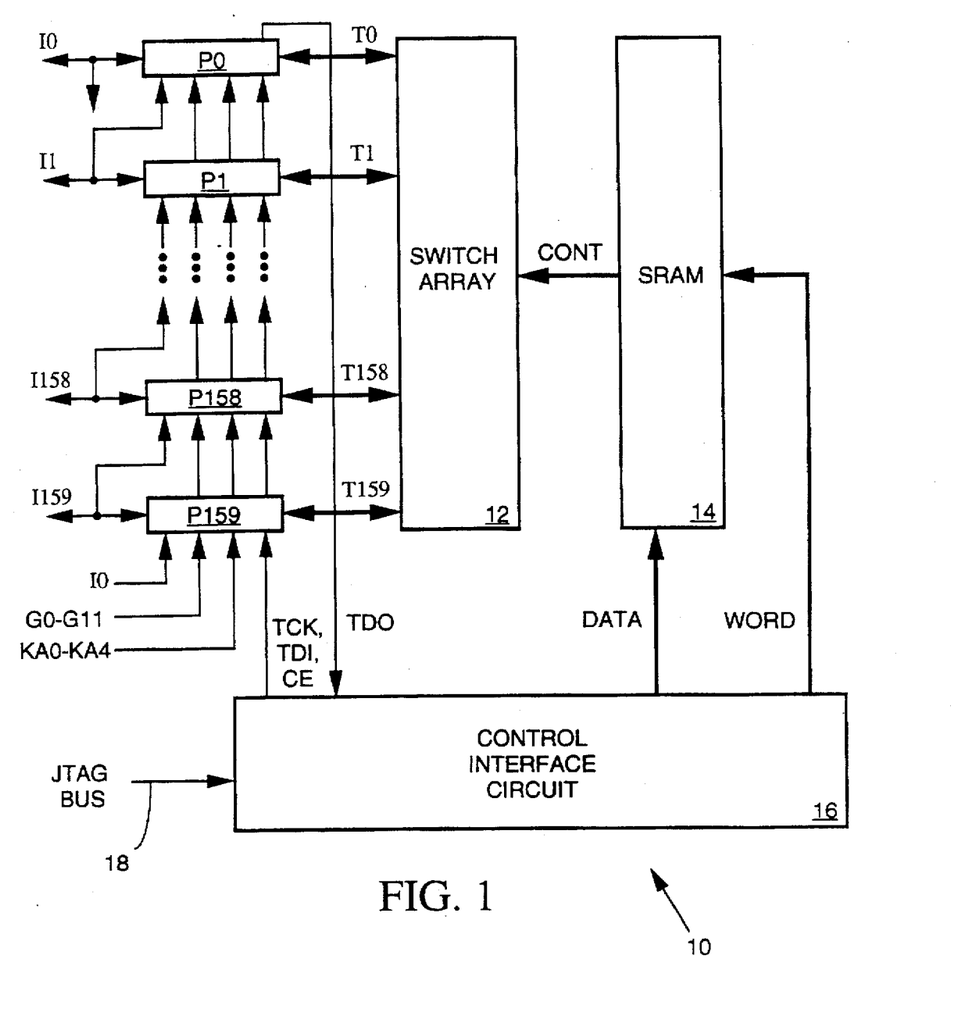
FIG. 1 illustrates in block diagram form a programmable crossbar switch in accordance with the present invention.

FIG. 1 illustrates in block diagram form a programmable crossbar switch 10 in accordance with the present invention. Crossbar switch 10 includes a set of 160 programmable buffer ports P0–P159, a switch array 12, a static random access memory (SRAM) 14, and control interface circuit 16. Each port P0–P159 provides a buffered data signal path between an I/O terminal I0–I159 and a corresponding terminal T0–T159 of switch array 14. Switch array 12 selectively routes data signals between pairs of its terminals T0–T159 in accordance with routing control signals CONT provided by SRAM 14. An external host controller transmits routing control data to control interface circuit 16 via an IEEE standard JTAG bus 18. Control interface circuit 16 writes the routing control data into SRAM 14 and that data sets the states of the routing control signals CONT. The host controller also transmits data to interface circuit 16 indicating various operating modes of ports P0–P159. The interface circuit 16 forwards the mode control data in serial fashion to ports P0–P159 via a data line TDI using an enable signal CE to input enable registers within the ports and a TCK clock signal to clock the data into the registers.

Crossbar switch 10 may, for example, be programmed such that an input data signal arriving at terminal I0 departs at terminal I158. Port P0 buffers the data signal arriving at terminal I0 onto terminal T0. Switch array 12 routes the data signal from terminal T0 to terminal T158 in accordance with the routing control signals CONT supplied by SRAM 14. Port P158 then buffers the data signal at terminal T158 onto terminal I158. Array 12 can route data signals between any two terminals T0–T159 by turning on the appropriate pass transistor so that it provides a data signal path between the two terminals. Switch 12 is "nonblocking" in that only one pass transistor needs to be turned on in order to make a connection between any two ports and a connection between any two terminals can always be established regardless of the state of other connections provided by the switch. Thus the switch array 12 can make or break a connection between any two terminals without affecting any other connection.

Figure 2:
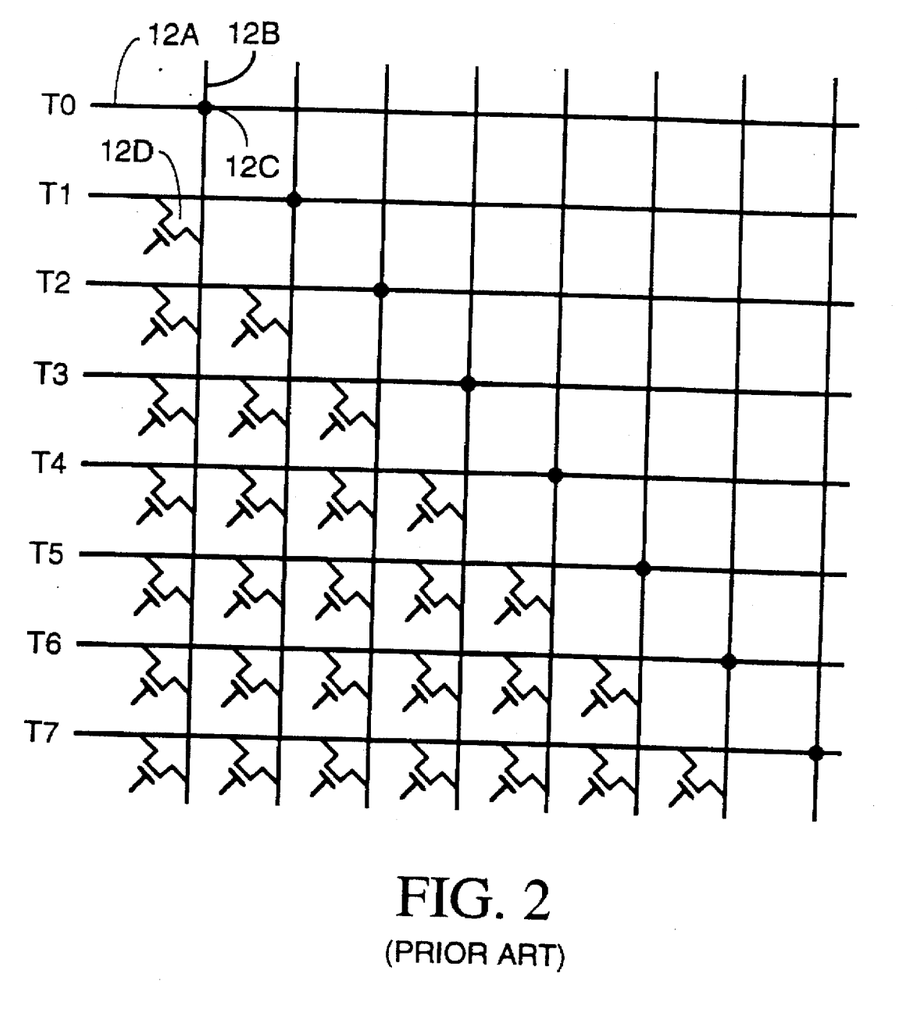
FIG. 2 illustrates switch array 12 of FIG. 1 in schematic diagram form.

FIG. 2 illustrates an 8×8 portion of switch array 12 of FIG. 1. A set of eight horizontal buses 12A respectively tied to terminals T0–T7 are connected to a set of 8 vertical buses 12B at nodes 12C along a main diagonal. A triangular array of pass transistors 12D also interconnects buses 12A and 12B such that each pass transistor selectively interconnects a unique pair of terminals T0–T7. The gate of each pass transistor is controlled by a separate one of routing control signals CONT of FIG. 1. The layout of switch array 12 of FIG. 1 is similar to that shown in FIG. 2 but includes 160 horizontal and 160 vertical buses and a proportionately larger triangular array of pass transistors.

SRAM 14 is a static random access memory for storing 160 data words, each data word having up to 160 bits. SRAM 14 includes a 160 bit parallel data input (DATA) and 160 word select inputs (WORD). SRAM 14 replaces one of its stored data words with a word appearing on DATA whenever one of the WORD lines is asserted. The particular WORD line being asserted indicates the stored word to be replaced. To write data into SRAM 14, an external host controller sends a set of 160-bit data words to controller 16 via the serial JTAG bus 18. The host controller also sends an address with each data word indicating a location within SRAM 14 at which the data word is to be stored. Controller 16 places each word on the DATA lines to SRAM 14 and strobes one of the 160 WORD lines as indicated by the address accompanying the data from the host controller. SRAM 14 stores one bit for each pass transistor in array 12 and each routing control signal CONT output of SRAM 14 indicates the state of a separate bit stored in SRAM 14. Thus each bit in SRAM 14 controls the switching state of a corresponding pass transistor switch in array 12.

Figure 3:
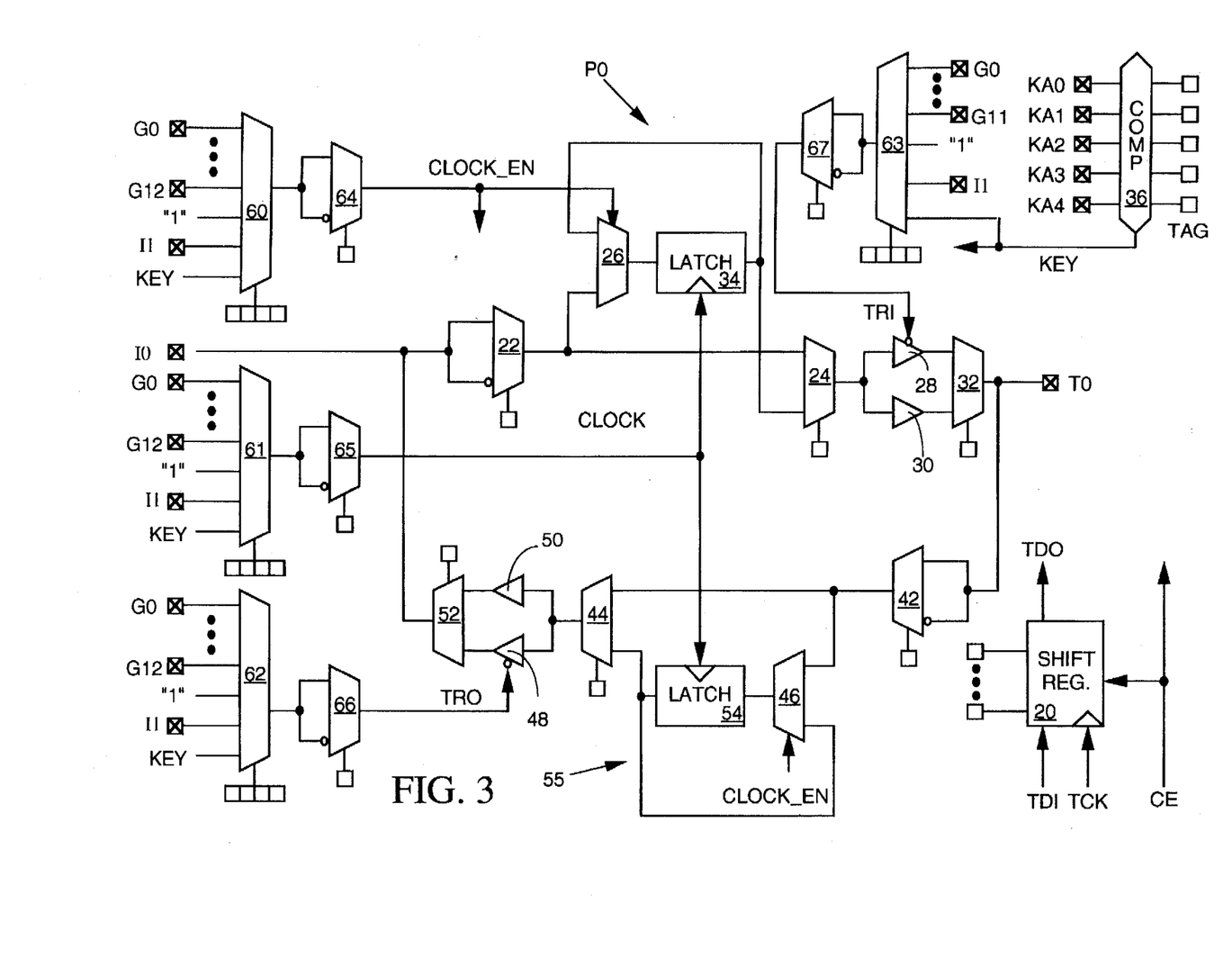
FIG. 3 illustrates port P0 of FIG. 1 in more detailed block diagram form.

FIG. 3 illustrates port P0 in more detailed block diagram form. Ports P1–P159 are similar. Port P0 may operate in any of several modes as selected by programming data sent to the port from the host computer via controller 16. The programming data, stored in a shift register 20, controls states of various multiplexers within the port. The multiplexers select the port's operating modes by choosing data signal routing paths within the port. Depending on the selected operating mode, the port may buffer data signals passing through the port in response to various mode control signals (CLOCK, CLOCK_EN, TRI and TRO) which are derived from selected input control signals.

Input Signal Path

An externally generated input data signal arriving at terminal I0 is delivered to inverting and noninverting inputs of a multiplexer 22 controlled by a bit stored in shift register 20. If the port is operating in an "inverting" mode, multiplexer 22 passes its inverting input to its output. When operating in a "noninverting" mode multiplexer 22 passes its noninverting input to its output. The output of multiplexer 22 is supplied to inputs of multiplexers 24 and 26. Multiplexer 26, when enabled by a clock enable signal (CLOCK_EN) ties the output of multiplexer 22 to a latch 34 which latches its input onto the input of multiplexer 24 in response to a clock signal (CLOCK). When the port is operating in a "latched" mode multiplexer 24 ties the output of latch 34 to a pair of buffers 28 and 30. In a "flow-through" mode, multiplexer 24 passes the incoming data signal from multiplexer 22 to buffer 28 and 30, which deliver their outputs to two inputs of a multiplexer 32. When the port is configured to operate in a "tristate" operating mode, multiplexer 32 delivers the output of tristate buffer 28 to terminal T0. In a non-tristate mode, multiplexer 32 routes the output of buffer 30 to terminal T0.

Output Signal Path

A switch array output data signal arriving at terminal T0 from the crossbar switch is delivered to inverting and noninverting inputs of a multiplexer 42 controlled by a bit stored in shift register 20. If the port is operating in the inverting mode, multiplexer 42 passes the inverting input to its output. In the noninverting mode multiplexer 42 passes its noninverting input to its output. The output of multiplexer 42 is supplied to inputs of multiplexers 44 and 46. In the flow-through mode, multiplexer 44 passes the incoming data signal from multiplexer 42 to a tristate buffers 48 and a non-tristate buffer 50, which deliver their outputs to two inputs of a multiplexer 52. In the tristate mode, multiplexer 52 ties the output of tristate buffer 48 to terminal I0. In the non-tristate mode, multiplexer 52 passes the output of buffer 50 to terminal I0. Multiplexer 46, when enabled by the clock enable signal CLOCK_EN, connects the output of multiplexer 42 to a latch 54 which latches its input onto the input of multiplexer 54. Latch 54 and multiplexer 46 function as an enabled latch 55. In the latched mode multiplexer 44 delivers the output of latch 54 to buffers 48 and 50.

Control Signal Paths

A comparator 36 compares 5 bits (TAG) stored in shift register 20 to a 5-bit port address appearing on an externally controlled "key" bus KA0–KA4. If the key bus address matches TAG, comparator 36 asserts an output signal (KEY). The KEY signal is supplied to an input of each of multiplexers 60–63. A set of 13 externally controlled inputs G0–G12, the I1 terminal of FIG. 1, and hardwired a true "1" logic level provide additional inputs to each multiplexer 60–63. The outputs of multiplexers 60–63 are tied to inverting and noninverting inputs of a set of multiplexers 64–67, respectively. The output of multiplexer 64 provides the CLOCK_EN signal for controlling multiplexers 26 and 46, the output of multiplexer 65 provides the CLOCK signal for controlling latches 34 and 54, and the outputs of multiplexers 66 and 67 provide the tristate control signals TRO and TRI for controlling tristate buffer 28 and 48, respectively.

Operating Modes Port P0 of FIG. 2 may be configured to operate in combinations of several modes by data stored in shift register 20 as described below.

Input/Output/Bidirectional/Inactive Modes

The input data signal path routes an incoming data signal from terminal I0 to terminal T0 via devices 22–32 and the output data signal path routes an outgoing data signal from terminal T0 to terminal I0 via devices 42–52. Port P0 may be configured to operate in any one of three routing modes: input, output or bidirectional.

In the input mode, only the input path is active. The output data signal path is disabled by setting multiplexer 52 to select the output of tristate buffer 48 and setting TRO high to place buffer 48 in tristate mode. TRO may be set high by switching multiplexer 62 to select its "1" input and switching multiplexer 66 to select its noninverting input.

In the output mode, only the output path is active. The input data signal path is disabled by setting multiplexer 32 to select the output of tristate buffer 28 and setting TRI high to place buffer 28 in tristate mode. TRI may be set high by switching multiplexer 63 to select its "1" input and switching multiplexer 66 to select its noninverting input.

In the bidirectional mode, the input and output paths are alternatively active with the active path being chosen by a selected, externally generated, direction control signal. To configure to port to operate in the bidirectional mode, multiplexers 32 and 52 are switched to select outputs of tristate buffers 32 and 52, respectively. Multiplexers 62 and 63 are both set to select the same control signal input, either one of signals G0–G12, the I1 signal, or the KEY signal. One of multiplexers 66 and 67 is set to select its inverting input while the other is set to select its noninverting input. For example we can set multiplexers 62 and 63 to select G0, multiplexer 66 to select its noninverting input and multiplexer 67 to select its inverting input. Thus whenever an external controller asserts the G0 line, the input path will be active and whenever the external controller deasserts the G0 line, the output path will be active. G0 therefore acts as a direction control signal.

When the port is in the inactive mode, neither the input nor output paths are active. The port is placed in the inactive mode by switching multiplexers 32 and 52 to select the outputs of tristate buffers 28 and 48, respectively, and setting the TRI and TRO signals to put buffers 28 and 48 in tristate condition. This is done by setting multiplexers 62 and 63 to select their "1" inputs and appropriately switching multiplexers 66 and 67.

Latched/Flow-through Modes

Port P0 input or output paths may be configured to operate in either the latched or flow-through modes. In the latched mode, latch 34 latches data signals flowing in the input path and latch 54 latches data signals flowing in the output path. In the flow-through mode, data signals flowing in the input and output paths bypass the latches.

To configure the input path for the latched mode, multiplexer 24 is switched to select the output of latch 34. Multiplexer 60 is set to select a desired control input for the clock enable signal CLOCK_EN and multiplexer 64 is set depending on whether the control input is to be inverted. When the clock enable signal CLOCK_EN is to be externally controlled, multiplexer 60 selects one of external control signal inputs G0–G12, I1 or KEY. The CLOCK_EN signal controls the switching state of multiplexer 26. When no external clock enable control signal is desired, multiplexer 60 is set to select the "1" input and multiplexer 64 is set to select its noninverting input. In such case, multiplexer 26 always selects the output of multiplexer 22.

When an input data signal arrives at port I0 multiplexer 22 passes it to multiplexer 26. When the CLOCK_EN signal is asserted, multiplexer 26 passes the input data signal to latch 34 which latches the input onto an input of multiplexer 24 when the CLOCK signal is assert. Multiplexer 61 is set to select the desired external control source for the CLOCK signal and multiplexer 65 is set depending on whether the input control signal driving the CLOCK signal is to be inverted. Multiplexer 24 passes the input data signal onward to terminal T0 via buffer 28 or 30 and multiplexer 32. Note that the output of latch 34 is tied back to an input of multiplexer 26. Thus in the latched mode, the port stores the state of the input data signal at the I0 terminal as it existed when the CLOCK-EN and CLOCK signals were last concurrently asserted.

In the flow-through mode, multiplexer 24 is set to select the output of multiplexer 22. Thus an input data signal arriving at terminal I0 is routed directly to terminal T0 via multiplexers 22, 24, and 32 and either buffer 28 or 30, bypassing multiplexer 26 and latch 34.

The configuration and operation of the output data signal path for latched or flow-through modes are similar to the configuration and operation of the input data signal path. Note that the input and output paths may be configured independently, if desired, with one path operating in latched mode and the other operating in flow-through mode.

Noninverting/Inverting Modes

In the noninverting mode, the port's input and output data signals are of the same polarity. In the inverting mode, the port output data signal polarity is reversed from that of the input data signal. In the input and output data signal paths, multiplexers 22 and 42, respectively, select inverting and non- inverting modes by selecting inverting or non-inverting inputs.

Tristate/Non-tristate Modes

When the input path is configured to operate in the tristate mode, multiplexer 32 is set to select the output of tristate buffer 28 and multiplexer 63 is set to select a desired input control signal (G0–G12, I1, or KEY) to act as the tristate buffer control signal TRI. Multiplexer 67 determines whether the external control signal is inverted. When the output path is configured to operate in the tristate mode, multiplexer 52 is set to select the output of tristate buffer 48 and multiplexer 62 is set to select a desired input control signal (G0–G12, I1, or KEY) to drive the tristate buffer control signal TRO. Multiplexer 66 determines whether the input control signal is inverted. When the input path is to operate in the non-tristate mode, multiplexer 32 selects the output of buffer 30. Similarly, when the output path is to operate in the non-tristate mode, multiplexer 52 selects the output of buffer 50.

Port Control and Addressing

As illustrated in FIG. 2, port clock enable and clock signals, CLOCK and CLOCK_EN, and the input and output tristate control signals TRI and TRO can be derived from any of several external sources (G0–G12, I1, or KEY) depending on the selections made by multiplexers 60–63. The G0–G12 input control signals are provided in parallel to each port P0–P159 and are particularly useful, for example, in applications where the ports operate in the latched mode and the CLOCK signal in all the ports are to be synchronized.

When a mode control signal such as the TRO signal must be independently controlled for more than thirteen active ports, there aren't sufficient numbers of dedicated control inputs G0–G12 to control them. However, as illustrated in FIG. 1, each input port P(N), for (N)={0, . . , 159} use terminal I(N+1) as an additional control input. For port P0, as illustrated in FIG. 2, terminal I1 provides an additional control input to multiplexers 60–63. This additional control input can be used when the associated port P1 is inactive. For example, when all even numbered ports {P0, P2, . . . P158} are active and all the odd numbered ports {P1, P3, . . . P159} are inactive, each odd numbered terminal {I1, I3, . . . I159} can provide an independent control input for a corresponding even numbered port {P0, P2, . . . P158}. Thus terminals of inactive ports can provide independent control inputs for up to 80 active ports.

The TAG addressing scheme allows the 5-line key bus KA0–KA4 to independently control up to 32 different ports. As discussed above, the KEY signal is asserted by comparator 36 when the port address on the key bus KA0–KA4 matches the five TAG bits stored in shift register 20. Since the TAG bits can be set independently in each port P0–P159, the TAG bits constitute a port address which can have any of 32 values. The TAG addressing scheme reduces the number of control input terminals needed to provide a given level of independent control over the ports. However an external controller making use of the key bus must include appropriate encoding circuits to operate the key bus. Those skilled in the art will appreciate that the number of lines in the key bus may be increased to increase the number of ports that can be independently addressed by the KEY bus. For example a KEY bus having 8 lines would allow 256 unique addresses, more than sufficient to permit all 160 ports to be independently addressed.

Time Division Multiplexing

Figure 4:
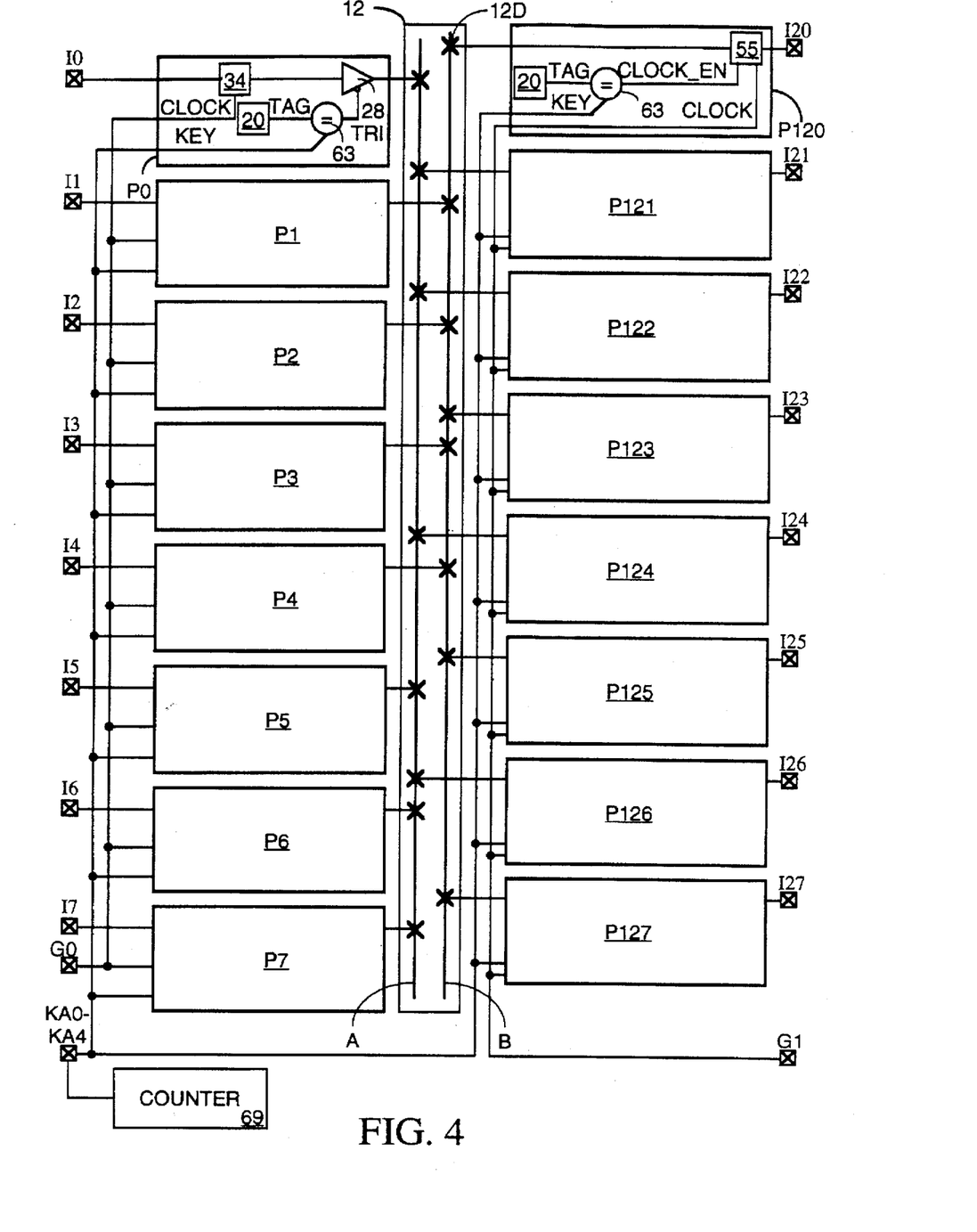
FIG. 4 illustrates a portion of the crossbar switch of FIG. 1 configured for use as a time division multiplexer.

Crosspoint switch 10 of FIG. 1 can implement time division multiplexing wherein the connection pattern provided by the switch changes periodically. FIG. 4 is a signal flow diagram illustrating a configuration for crosspoint switch 10 as a time division multiplexer. The ports P7 are configured as input ports and ports P120–P127 are configured as output ports. The pass transistors 12D within switch array 12 are set to connect four input ports P0, P4, P6, P7 and four output ports P121, P122, P124 and P126 to a single bus A within switch array 12 and to connect the remaining four input ports P1, P2, P3 and P5 and four output ports P120, P123, P125 and P127 to a second bus B within switch array 12.

In port P0 multiplexers 22, 24 and 32 of FIG. 3 (not shown in FIG. 4) are configured to route an input signal at terminal I0 onto bus A via its latch 34 and tristate buffer 28. Latch 34 is clocked by an external clock signal supplied to terminal G0 via multiplexers 61 and 65 of FIG. 3 (not shown in FIG. 4). Multiplexers 63 and 67 of FIG. 3 are configured so that the KEY output of comparator 36 controls the control input TRI of tristate buffer 28. Ports P1–P7 are configured in a similar manner.

In port P120, multiplexers 42, 44 and 52 of FIG. 3 (not shown in FIG. 4) are configured to route an output signal at bus A via its latch 55. Latch 55 is clocked by a second external clock signal supplied to terminal G1 via multiplexers 61 and 65 of FIG. 3 (not shown in FIG. 4). Multiplexers 63 and 67 of FIG. 3 are configured so that the KEY output of comparator 36 drives the clock enable input CLOCK_EN of latch 55. Ports P121–P127 are configured in a similar manner.

Assume that we wish to transmit signals between pairs of these ports at different time slots according to Table I

TABLE I

| TIME SLOT | INPUT PORT | OUTPUT PORT | TAB ADDR |
|---|---|---|---|
| 0 | P0 | P121 | 00000 |
| 0 | P1 | P120 | 00000 |
| 1 | P5 | P122 | 00001 |
| 1 | P2 | P123 | 00001 |
| 2 | P6 | P124 | 00010 |
| 2 | P3 | P125 | 00010 |
| 3 | P7 | P126 | 00011 |
| 3 | P4 | P127 | 00011 |

To make the crosspoint switch operate as a time division multiplexer, we store in register 20 of each of the ports the tag address listed in TABLE I and then connect a module four counter 69 to the key address bus KA0–KA4. The module four counter places a 5-bit value on KA0–KA4 which continuously repeats the pattern 00000,00001,00010, 00011. Whenever KA0–KA4 is 00000 (time slot 0), the output of comparator 36 of port P0 turns on tristate buffer 28 so that a pulse on G0 clocks a signal on I0 through latch 34 and buffer 28 and onto to bus A. Comparator 36 of port P121 enables latch 55 so that the pulse on G0 clocks the signal on bus A through latch 55 and onto output terminal I121. At the same time, the output of comparator 36 of port P1 turns on its tristate buffer 28 so that a pulse on G0 clocks a signal on I1 through port P1 latch 34 and buffer 28 and onto to bus B. Comparator 36 of port P120 enables its latch 55 so that the pulse on G1 clocks the signal on bus B through latch 55 and onto output terminal I120.

When the 5-bit value on KA0–KA4 changes to 00001 (time slot 1), tristate buffers 28 of ports P0 and P1 turn off and latches 55 of ports P120 and P121 are no longer enabled. Instead tristate buffers 28 of ports P2 and P5 are turned on and latches 55 of ports 122 and 123 are enabled. Thus on each pulse of the clock signal on G0/G1 signals pass from I5 to I122 and from I2 to I123.

As the 5-bit count on KA0–KA4 continues to increase different sets of input and output ports are enabled in accordance with Table I. After the count reaches 00011 it is reset to 00000. Thus the crossbar switch provides time division multiplexing in which its signal routing differs for each of four time slots as defined by the count on the KA0–KA4 inputs. The 5-bit KA0–KA4 input bus permits the crossbar switch to provide separate signal routing configurations for up to 32 time slots. Array 12 provides great flexibility in the manner in which signals are routed in any given time slot.

Port Initialization

Referring to FIG. 1, an external host controller initializes the port P0–P159 by transmitting control data to interface circuit 16 via the JTAG bus 18. The interface circuit 16 forwards the control data to the ports. As shown in FIG. 2, the control data is stored in the shift register 20 of each port. As discussed herein above, the data in shift register 20 selects the various operating modes of the port by controlling multiplexers 22, 24, 32, 42, 44, 54 and 60–67.

Figure 5:
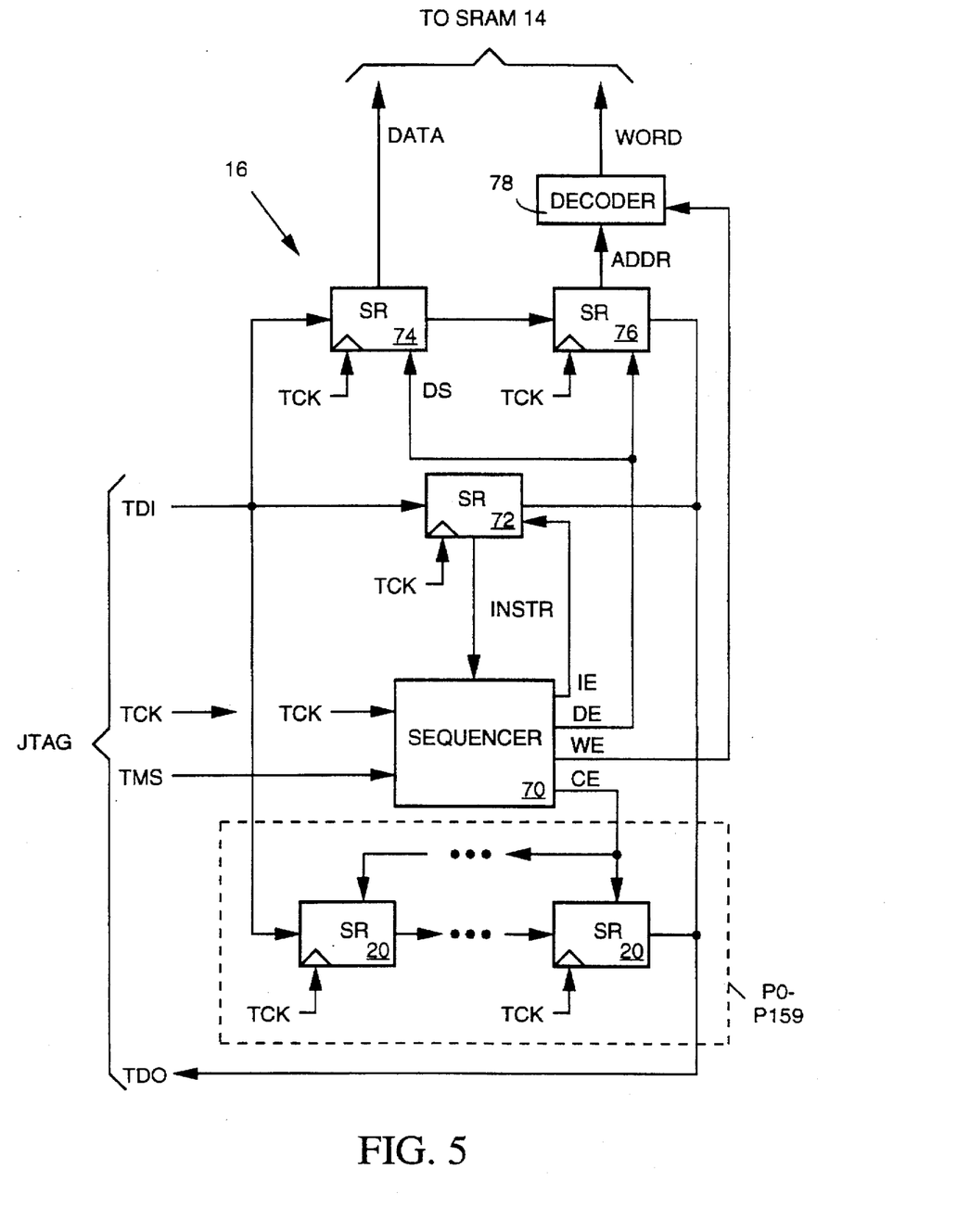
FIG. 5 illustrates the control interface circuit of FIG. 1 in more detailed block diagram form.

FIG. 5 illustrates control interface circuit 16 in more detailed block diagram form. The JTAG bus consists of four lines TDI, TCK, TMS and TDO. The TDI and TDO lines carry data in serial form into and out of circuit 16. TCK is a clock signal controlled by the host controller. The TMS line is a control signal pulsed by the host controller to indicate the host is about to transmit an instruction code on the TDI line. The TMS line provides an input to a sequencer 70. On receipt of a TMS signal pulse from the host controller, sequencer 70 asserts a control signal IE to input enable a shift register 72. Thereafter, on each pulse of the TCK clock signal from the host controller, shift register 72 shifts in a bit of an instruction sent by the host controller via the TDI line. Sequencer 70 counts pulses of the TCK signal and when it determines that all bits of the instruction (suitably 1 bit) have been stored in shift register 72, sequencer 70 turns off the IE enable signal and carries out one of two actions as indicated by the INST instruction provided as input to the sequencer.

The INST instruction may indicate that the host controller is about to send data for programming the shift registers 20 of ports P0–P159 which are all connected in series between the TDI and TDO lines. In response to such instruction sequencer 70 asserts the CE signal to input enable the shift registers 20. Thereafter, on each pulse of the TCK signal from the host controller, shift registers 20 shift in a bit of the control data sent by the host controller via the TDI line. Sequencer 70 counts pulses of the TCK signal and when it determines that all bits of the control data have been stored in shift registers 20, sequencer 70 turns off the CE enable signal. Each of shift registers 20 in the 160 ports P0–P159 stores 31 control bits, so the host controller transmits a bit stream consisting of 160×31 control bits to program all of the ports.

The instruction stored in shift register 72 may indicate that the host controller is about to send a 160-bit data word (DATA) to be written into SRAM 14 of FIG. 1 along with an 8-bit address ADDR selecting one of 160 storage locations within SRAM 14 where DATA is to be written. In response to this instruction sequencer 70 asserts the DE signal to input enable shift registers 74 and 76 which are connected in series between the TDI and TDO lines. Thereafter, on each pulse of the TCK signal from the host controller, shift registers 74 and 76 shift in a bit of a bit stream containing the data and address sent by the host controller via the TDI line. Shift register 74 receives the DATA word and shift register 76 receives the ADDR bits. Sequencer 70 counts pulses of the TCK signal and when it determines that all data and address bits have been stored in shift registers 74 and 76, sequencer 70 turns off the DE enable signal and pulses a write enable signal WE. Shift register 74 forwards the 160-bit DATA word to the SRAM data input. When sequencer 70 asserts the WE signal, a decoder 78 decodes the 8-bit address ADDR stored in shift register 76 and asserts an appropriate one of 160 write enable inputs (WORD) of the SRAM. This tells the SRAM to store the DATA at the indicated memory address. This memory write process is repeated for each of the 160 storage locations in the SRAM in order to fully program the switch array.

For test purposes, the TDO outputs of shift registers 20 and 72 and 76 are connected together and brought back to the host controller as the TDO line of the JTAG bus. Whenever data is shifted into the registers via the TDI line, previously stored data is shifted out of the registers onto the TDO line. The host controller can monitor data shifted onto the TDO line for test purposes to ensure that the crossbar switch is responding properly to instructions.

Thus has been described an electronic crossbar switch employing a switch array for selectively routing data signals between its terminals in which a separate port provided for each terminal buffers data signals flowing in and out of the switch. Each port can be configured to operate with or without tristate buffering under control of a tristate control signal, to optionally latch input or output signals in response to clock and clock enable signals, and to buffer signals passing in or out of the switch terminal in response to a direction control signal. A set of control inputs provided in common to all ports, allows an external host to transmit input control signals to each port. Each port may be programmed to select any of its input control signals as its tristate, clock enable, clock or direction control signal. A parallel "key" bus is also provided in common to all ports for conveying a key address from the host controller. Each port stores an adjustable port address and when the key address matches the port address, the port asserts an internal "KEY" signal. Each port may be configured to use the KEY signal selectively as either its tristate, clock enable, clock or direction control signal.

While the foregoing specification has described preferred embodiment(s) of the present invention, one skilled in the art may make many modifications to the preferred embodiment without departing form the invention in its broader aspects.

For example the number of lines in the key bus may be increased or decreased or latches 34 and 54 could be replaced with other types of storage devices such as registers. The ports could be provided with additional signal processing capability operating under control of selected ones of the external control signals. The appended claims therefore are intended to cover all such modifications as fall within the true scope and spirit of the invention.

What is claimed is:

1. An apparatus for selectively routing data signals between first terminals in response to input routing control data, port configuration data and port addressing data, the apparatus comprising:

a plurality of second terminals, each second terminal corresponding to a separate one of said first terminals;

switch means, connected to said second terminals and receiving said input routing control data, for routing signals between pairs of said second terminals selected in accordance with said input routing control data; and a plurality of ports, each port receiving said input port addressing data, each port comprising means for receiving and storing a separate portion of said configuration data, said separate portion including a tag address and selection control data, each port including means asserting and deasserting a key control signal according to whether the received port addressing data matches said tag address, each port comprising buffer means connected between a separate corresponding pair of said first and second terminals and buffering a data signal between said corresponding pair, a mode of operation of said buffer means being controlled by a buffer control signal referenced by said selection control data, and each port comprising means for routing said key control signal to said buffer means as said buffer control signal when said key control signal is referenced by said selection control data.

2. The apparatus in accordance with claim 1 wherein said buffer means comprises a tristate buffer and wherein said buffer control signal controls a state of said tristate buffer.

3. The apparatus in accordance with claim 1 wherein said buffer means comprises data storage means for storing data conveyed by said data signal and wherein said buffer control signal controls when said data storage means stores said data conveyed by said one of said data signals.

4. The apparatus in accordance with claim 1 wherein said buffer means port comprises a bidirectional buffer and wherein said buffer control signal controls a direction in which said buffer buffers said data signal between the pair of first and second terminals to which said buffer means is connected.

5. An apparatus for selectively routing data signals between first terminals in response to input routing control data, port configuration data, port addressing data, and input control signals, the apparatus comprising:

a plurality of second terminals, each second terminal corresponding to a separate one of said first terminals;

switch means, connected to said second terminals and receiving said input routing control data, for routing signals between pairs of said second terminals selected in accordance with said input routing control data; and a plurality of ports, each port receiving said input port addressing data, each port comprising means for receiving and storing a separate portion of said configuration data, said separate portion including a tag address and selection control data, each port including means asserting and deasserting a key control signal according to whether the received port addressing data matches said tag address, each port comprising buffer means connected between a separate corresponding pair of said first and second terminals and buffering a data signal between said corresponding pair, a mode of operation of said buffer means being controlled by a buffer control signal, and each port comprising selection means receiving said input control signals, said key control signal, and said selection control data, for routing one signal of said key control signal and said input control signals to said buffer means as said buffer control signal, said selection means selecting said one signal in response to said selection control data.

6. The apparatus in accordance with claim 5 wherein said buffer means comprises a tristate buffer and wherein said buffer control signal controls a state of said tristate buffer.

7. The apparatus in accordance with claim 5 wherein said buffer means comprises data storage means for storing data conveyed by said data signal and wherein said buffer control signal controls when said data storage means stores said data conveyed by said one of said data signals.

8. The apparatus in accordance with claim 5 wherein said buffer means comprises a bidirectional buffer and wherein said buffer control signal controls a direction in which said buffer buffers said data signal between said pair of first and second terminals to which said buffer means is connected.

9. An apparatus for selectively routing data signals between first terminals in response to input routing control data, port configuration data and port addressing data, and input control signals, the apparatus comprising:

a plurality of second terminals, each second terminal corresponding to a separate one of said first terminals;

switch means, connected to said second terminals and receiving said input routing control data, for routing signals between pairs of said second terminals selected in accordance with said input routing control data; and plurality of ports, each port receiving said input port addressing data, each port comprising means for receiving and storing a separate portion of said configuration data, said separate portion including a tag address and selection control data, each port including means asserting and deasserting a key control signal according to whether the received port addressing data matches said tag address, each port comprising buffer means connected between a separate corresponding pair of said first and second terminals and buffering a data signal between said corresponding pair, mode of operation of said buffer means being controlled by a plurality of control signals, and each port comprising means receiving said input control signals, said key control signal, and said selection control data, for routing a selected portion of said key control signal and said input control signals to said buffer means as said plurality of buffer control signals, said selection means selecting said portion in response to said selection control data.

10. The apparatus in accordance with claim 9 wherein said buffer means comprises a tristate buffer, wherein said one of said buffer controls signal controls a state of said tristate buffer, wherein said buffer means also comprises data storage means for storing data conveyed by said data signal, and wherein another of said buffer control signals controls when said data storage means stores said data conveyed by said one of said data signals.

11. The apparatus in accordance with claim 9 wherein said buffer means comprises a bidirectional buffer,
wherein one of said buffer control signals controls a direction in which said buffer buffers said data signal between said pair of first and second terminals to which said buffer means is connected,
wherein said buffer means also comprises data storage means for storing data conveyed by said data signal, and
wherein another of said buffer control signals controls when said data storage means stores said data conveyed by said one of said data signals.

12. An apparatus for selectively routing data signals between first terminals in response to input routing control data, port configuration data and port addressing data, and input control signals, the apparatus comprising:
a plurality of second terminals, each second terminal corresponding to a separate one of said first terminals;
switch means, connected to said second terminals and receiving said input routing control data, for routing signals between pairs of said second terminals selected in accordance with said input routing control data; and
a plurality of ports,
each port receiving said input port addressing data,
each port comprising means for receiving and storing a separate portion of said configuration data, said separate portion including selection control data,
each port comprising buffer means connected between a separate corresponding pair of said first and second terminals and buffering a data signal between said corresponding pair, modes of operation of said buffer means being controlled by a plurality of control signals, and
each port comprising means for routing a selected portion of said input control signals to said buffer means as said plurality of buffer control signals in response to the stored selection control data.

13. The apparatus in accordance with claim 12 wherein said buffer means comprises a tristate buffer,
wherein said one of said buffer controls signal controls a state of said tristate buffer,
wherein said buffer means also comprises data storage means for storing data conveyed by said data signal, and
wherein another of said buffer control signals controls when said data storage means stores said data conveyed by said one of said data signals.

14. The apparatus in accordance with claim 12 wherein said buffer means comprises a bidirectional buffer,
wherein one of said buffer control signals controls a direction in which said buffer buffers said one of said data signals between said pair of first and second terminals to which said buffer means is connected,
wherein said buffer means also comprises data storage means for storing data conveyed by said data signal, and
wherein another of said buffer control signals controls when said data storage means stores said data conveyed by said one of said data signals.

15. An apparatus for selectively routing data signals between first terminals in response to input routing control data, port configuration data and port addressing data, and input control signals, the apparatus comprising:
a plurality of second terminals, each second terminal corresponding to a separate one of said first terminals;
switch means, connected to said second terminals and receiving said input routing control data, for routing signals between pairs of said second terminals selected in accordance with said input routing control data; and
a plurality of ports,
each port receiving said input port addressing data,
each port comprising means for receiving and storing a separate portion of said configuration data, said separate portion including selection control data;
each port comprising buffer means connected between a separate corresponding pair of said first and second terminals and buffering one of said data signals between said corresponding pair, mode of operation of said buffer means being controlled by a buffer control signal, and
each port comprising selection means connected for receiving said input control signals and an input data signal arriving on another one of said first terminals for selecting one signal from among said input control signals and said input data signal and routing the selected one signal to said buffer means as said buffer control signal, the selection of said one signal being made in response to the stored selection control data.

16. A time division multiplexer, responsive to input routing data, to pulses of an input clock signal and to pulses of an input clock enable signal, for receiving first input data signals and producing in response thereto second output data signals, comprising:
means for producing a KEY count value;
a plurality of input ports, each input port receiving a separate one of said first input data signals and comprising
means for storing a first TAG value, receiving the KEY count and asserting a first control signal when the KEY count matches the first TAG value, and
means receiving said first input data signal for storing a first data value conveyed by said one first input data signal on each pulse of said input clock signal, and for producing a first output signal representing the stored first data value when said first control signal is asserted,
a plurality of output ports, each output port producing a separate one of said second output data signals and comprising
means for storing a second TAG value, receiving the KEY count and asserting a second control signal when the KEY count matches the second TAG value, and
means for receiving a second input data signal, for storing a second data value conveyed by said second input data signal on each pulse of said input clock signal, and for producing said one second output signal representing the stored second data value when said second control signal is asserted; and
switch means for receiving the first output signals produced by each of said input ports and routing it as a second input signal to at least one of said output ports selected in accordance with input routing data.

* * * * *